April 21, 1936.     M. WAGNER     2,038,326
MOTOR VEHICLE
Filed July 17, 1934
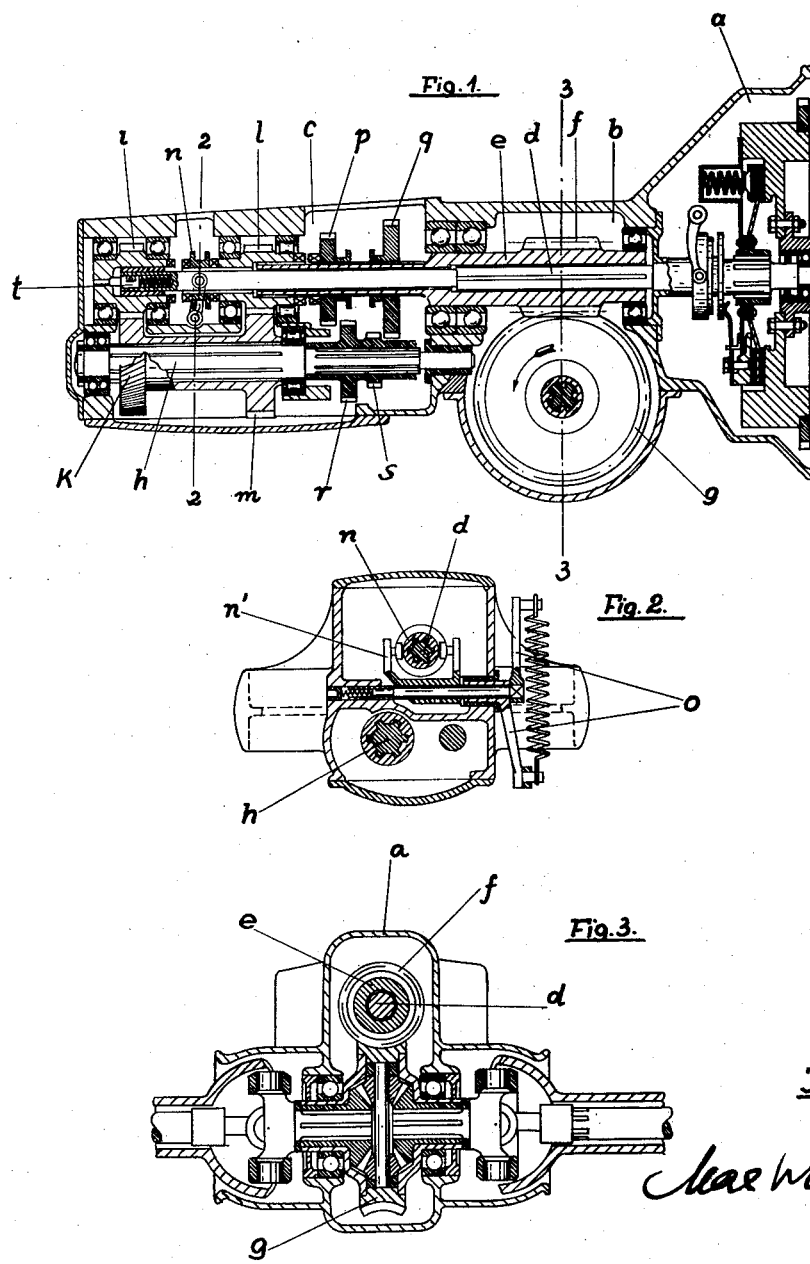

Patented Apr. 21, 1936

2,038,326

UNITED STATES PATENT OFFICE 2,038,326

MOTOR VEHICLE

Max Wagner, Stuttgart, Germany, assignor to Daimler-Benz Aktiengesellschaft, Stuttgart-Unterturkheim, Germany, a company of Germany Application July 17, 1934, Serial No. 735,598
In Germany July 20, 1933

3 Claims. (Cl. 74—326)

This invention relates to the driving set consisting of engine and gearing, which directly drives the axle shafts, more particularly for motor vehicles having the engine mounted at the rear or having a front wheel drive. The invention consists substantially in this that the gearing consists of a group composed of transmission gearing with disengageable toothed wheels, for instance, sliding wheels, and of a second group, which latter group comprises besides the direct speed at least a second speed, for instance, a noiseless speed formed of two pairs of gear wheels which are in constant engagement. The two gearing groups are disposed on that side of the axle shafts which is opposite to the engine.

The advantage of the invention resides in the particularly favourable distribution of the masses of the driving set at both sides of the axle shafts. This arrangement is also of particular advantage for housing the individual parts of the driving mechanism in the chassis. The driving and the transmitting main shaft of the gearing are arranged concentrically to one another in such a manner that one pair of gear wheels of the noiseless transmission connects only one of the two shafts, for instance, the inner shaft, with the lay shaft, while the other pair of gear wheels of this noiseless transmission may connect one or the other of the two main shafts or both simultaneously with the lay shaft.

In the accompanying drawing a constructional example of the gearing is shown in Fig. 1 in longitudinal section and in Fig. 2 in cross-section on the line 2—2 of Fig. 1 and in Fig. 3 in cross-section on the line 3—3 of Fig. 1.

In the common gear casing which is, for instance, connected by a flange to the front of an engine disposed at the rear there is mounted in the chamber $a$ the fly-wheel with the engine coupling, in the chamber $b$ the rear axle gearing and in the chamber $c$ the change speed gear. The drive is transmitted from the engine or from the engine coupling through the inner shaft $d$ which extends through the whole set, while for transmitting the drive from the gear the hollow shaft $e$ is used, which is disposed concentrically with the driving shaft and which through the worm $f$ and the worm wheel $g$ (with or without the intermediary of a differential gear) drives the axle shafts of the wheels which may be independently sprung. To the lay shaft $h$ is connected the inner shaft $d$ through the two pairs of permanently meshing toothed wheels $i$, $k$ and $l$, $m$ of which the wheels $i$ and $l$ are journalled loosely on the shaft $d$ and may be coupled through a change over coupling $n$ alternately with the driving shaft $d$. The change over coupling is constructed in the form of a dog clutch and may be provided with dogs, the end surfaces of which are beveled in the circumferential direction in such a manner that an engagement of the parts to be coupled can only take place when the speed of revolution is the same or approximately the same. The control is effected, for instance, in a known manner by a toggle or snap mechanism $o$, which consists of two levers connected to one another by a spring, and which only permits of the change over coupling being changed over from one extreme position to the other.

On the hollow shaft $e$ are also keyed so as to be capable of sliding, the sliding wheels $p$, $q$, which can be brought into engagement with the toothed wheels $r$, $s$ on the lay shaft. The toothed wheel $p$ can also be coupled with the toothed wheel $l$.

Both the pair of toothed wheels $i$, $k$, and the pair of toothed wheels $l$, $m$, may act as countershaft gearing for the sliding wheels. Preferably, however, the control is effected in such a manner that the change over coupling $n$ is interposed only between the direct speed and the noiseless transmission. Thus in the examples under consideration the following changes would result:

1st speed: $d, n, l, m, h, s, q, e$.
2nd speed: $d, n, l, m, h, r, p, e$.
3rd speed: $d, n, l, p, e$ (direct speed).
4th speed: $d, n, i, k, m, l, p, e$ (extra high speed).

The toothed wheels $i$ and $l$ are in each case journalled directly in the casing on either side of their tooth flanks, so that the toothed wheels will run smoothly. As will be seen a clearance is provided between the inner shaft and the hollow shaft $e$ over the entire length of the shaft. While the hollow shaft is journalled altogether three times in the casing, namely, at both sides of the worm $f$ and directly in the toothed wheel $l$, the driving inner shaft is journalled only at one end in the casing, namely in to the toothed wheel $i$, and at the other end in the fly-wheel. By this means small inaccuracies occurring in the fixing of the gear to the engine by a flange can be readily equalized. For fixing the inner shaft axially a resilient supporting member $t$ is provided.

What I claim is:

1. In a power driven vehicle, the combination of a driving axle with a power unit comprising a motor and driving clutch therefor arranged on one side of the driving axle and transmission gearing on the other side of the axle comprising an inner driving shaft operatively connected to the driving clutch, a hollow driven shaft concentric with the inner driving shaft and operatively connected to the driving axle, said inner driving shaft having an extended portion outside the hollow driving shaft at the end thereof remote from the driving clutch, a lay shaft, sliding change speed gearing between the lay shaft and the driven shaft, said lay shaft having an extended portion opposite the extended portion of the driving shaft, pairs of gear wheels in permanent engagement with one another for operatively connecting the driving shaft and the lay shaft to one another, one gear wheel of each pair fixed to the extended portion of the one shaft and the other being concentric with and rotatable relatively to the extended portion of the other shaft, and coupling means for coupling the rotatable gear wheels to the said extended shaft portion for establishing driving connection between the driving shaft and the lay shaft.

2. In a power driven vehicle, the combination of a driving axle with a power unit comprising a motor with a flywheel and a driving clutch arranged on one side of the driving axle and transmission gearing on the other side of the driving axle, comprising a gear casing, an inner driving shaft in said gear casing, one end of said driving shaft being rotatably mounted in the flywheel, a hollow driven shaft concentric with the inner driving shaft and operatively connected to the driving axle, said inner driving shaft having an extended portion outside the hollow driven shaft at the end thereof remote from the driving clutch, a lay shaft, change speed gearing between the lay shaft and the driven shaft, said lay shaft having an extended portion opposite the extended portion of the driving shaft, pairs of gear wheels in permanent engagement with one another for operatively connecting the driving shaft to the lay shaft, one gear wheel of each pair being mounted on the extended portion of the lay shaft, the other gears of each pair being rotatably mounted in the gear casing and the extended end of the driving shaft being rotatably mounted in one of said other gear wheels and the end of the driven shaft remote from the driving clutch being rotatably mounted in the other gear wheel of the other pair and clutches for operatively connecting the rotatable gear wheels to the driving shaft.

3. In a power driven vehicle, the combination as set forth in claim 2, with a resilient supporting member for supporting the driving shaft axially in the rotatable gear wheel.

MAX WAGNER.